(12) United States Patent
Mortun et al.

(10) Patent No.: US 8,455,759 B2
(45) Date of Patent: Jun. 4, 2013

(54) INLET COVER AND ADAPTER ASSEMBLY FOR ELECTRICAL COMPONENTS

(75) Inventors: Sorin Mortun, Irvington, NY (US); JianHua Li, New York, NY (US)

(73) Assignee: Hubbell Incorporated, Shelton, CT (US)

( * ) Notice: Subject to any disclaimer, the term of this patent is extended or adjusted under 35 U.S.C. 154(b) by 275 days.

(21) Appl. No.: 12/943,154

(22) Filed: Nov. 10, 2010

(65) Prior Publication Data

US 2012/0111596 A1  May 10, 2012

(51) Int. Cl.
*H02G 3/08* (2006.01)
(52) U.S. Cl.
USPC .............. 174/50; 174/520; 174/53; 174/67; 220/3.2; 220/3.3; 220/241
(58) Field of Classification Search
USPC ............... 174/50, 17 R, 520, 53, 57, 58, 66, 174/67; 220/3.2–3.9, 241, 242; 439/535, 439/536, 136, 173; 361/600, 601, 679.01, 361/728, 730, 752, 796
See application file for complete search history.

(56) References Cited

U.S. PATENT DOCUMENTS

| | | | |
|---|---|---|---|
| 3,137,763 A | 6/1964 | Jones | |
| 3,288,910 A | 11/1966 | Zerwes | |
| 4,454,565 A | 6/1984 | Krasij et al. | |
| 4,988,832 A * | 1/1991 | Shotey | 174/67 |
| 5,571,023 A * | 11/1996 | Anthony | 220/242 |
| 5,573,412 A * | 11/1996 | Anthony | 220/242 |
| 5,588,853 A * | 12/1996 | Anthony | 439/136 |
| 5,800,188 A * | 9/1998 | Barber et al. | 220/242 |
| 6,103,972 A | 8/2000 | Hagarty | |
| 6,740,813 B1 | 5/2004 | Gretz | |
| 7,227,079 B2 * | 6/2007 | Noest et al. | 174/50 |
| 7,683,255 B2 | 3/2010 | Hur et al. | |
| 7,709,735 B2 * | 5/2010 | Vigorito et al. | 174/67 |
| 7,972,154 B2 * | 7/2011 | Pech et al. | 439/173 |
| 8,013,245 B2 * | 9/2011 | Korcz et al. | 174/66 |
| 2009/0288853 A1 | 11/2009 | Binder et al. | |

FOREIGN PATENT DOCUMENTS

| | | |
|---|---|---|
| DE | 3738776 | 7/1988 |
| DE | 4312665 | 10/1994 |
| DE | 4407652 | 9/1995 |
| DE | 102005062494 | 6/2007 |
| FR | 2821212 | 8/2003 |

* cited by examiner

*Primary Examiner* — Angel R Estrada
(74) *Attorney, Agent, or Firm* — Garrett V. Davis; Mark S. Bicks; Alfred N. Goodman

(57) ABSTRACT

An electrical assembly includes a cover assembly, an electrical component such as a circuit breaker and an adapter for mounting the electrical component to the cover assembly. The cover assembly is adapted for mounting directly to a support surface such as a marine hull where the support surface has an opening to receive the electrical component. The electrical component and adapter are received in an opening in the support surface by the cover assembly. The adapter is constructed for coupling to an electrical component and one or more different cover assemblies having different screw hole patterns where the electrical component cannot be coupled directly to the cover assembly.

30 Claims, 8 Drawing Sheets

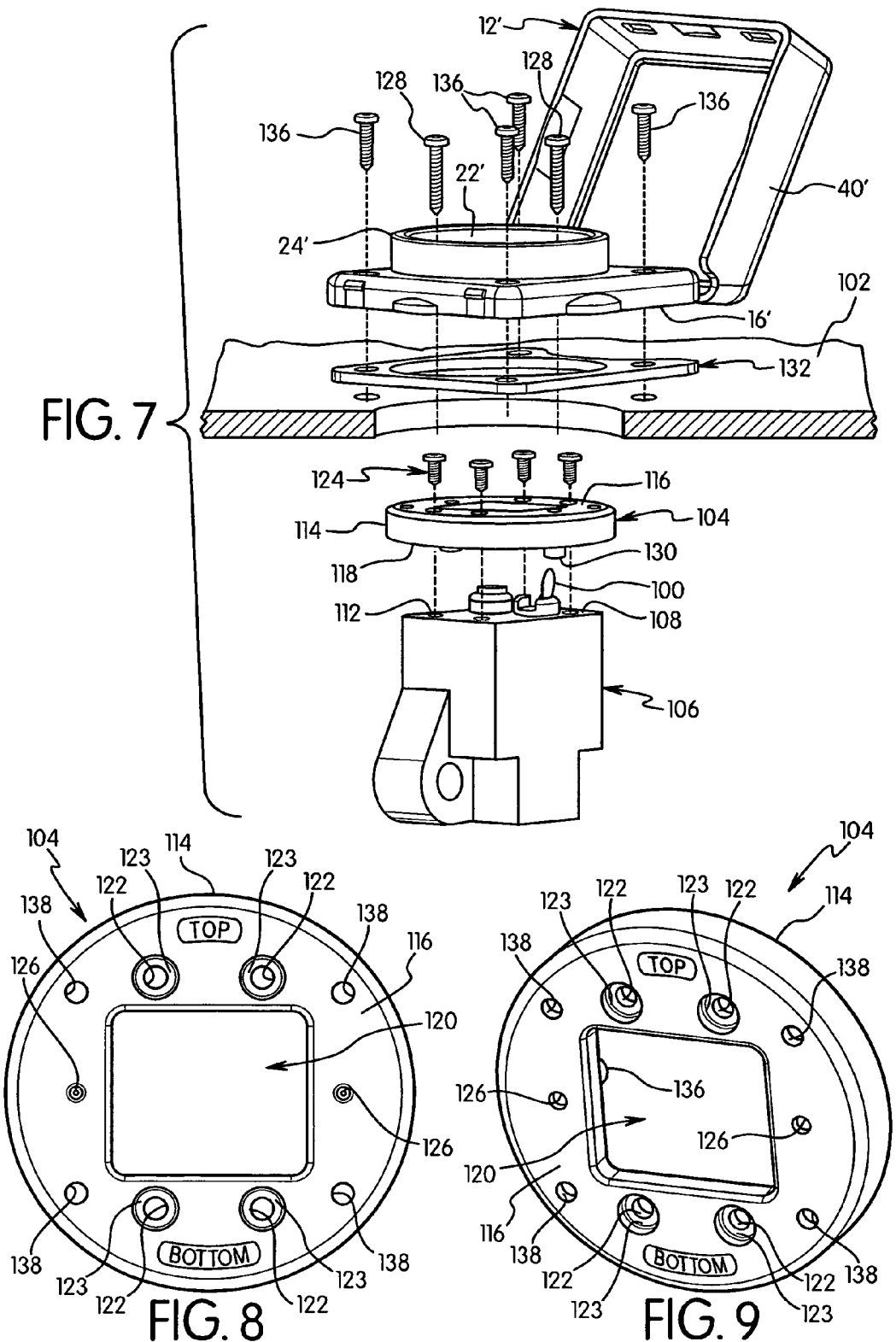

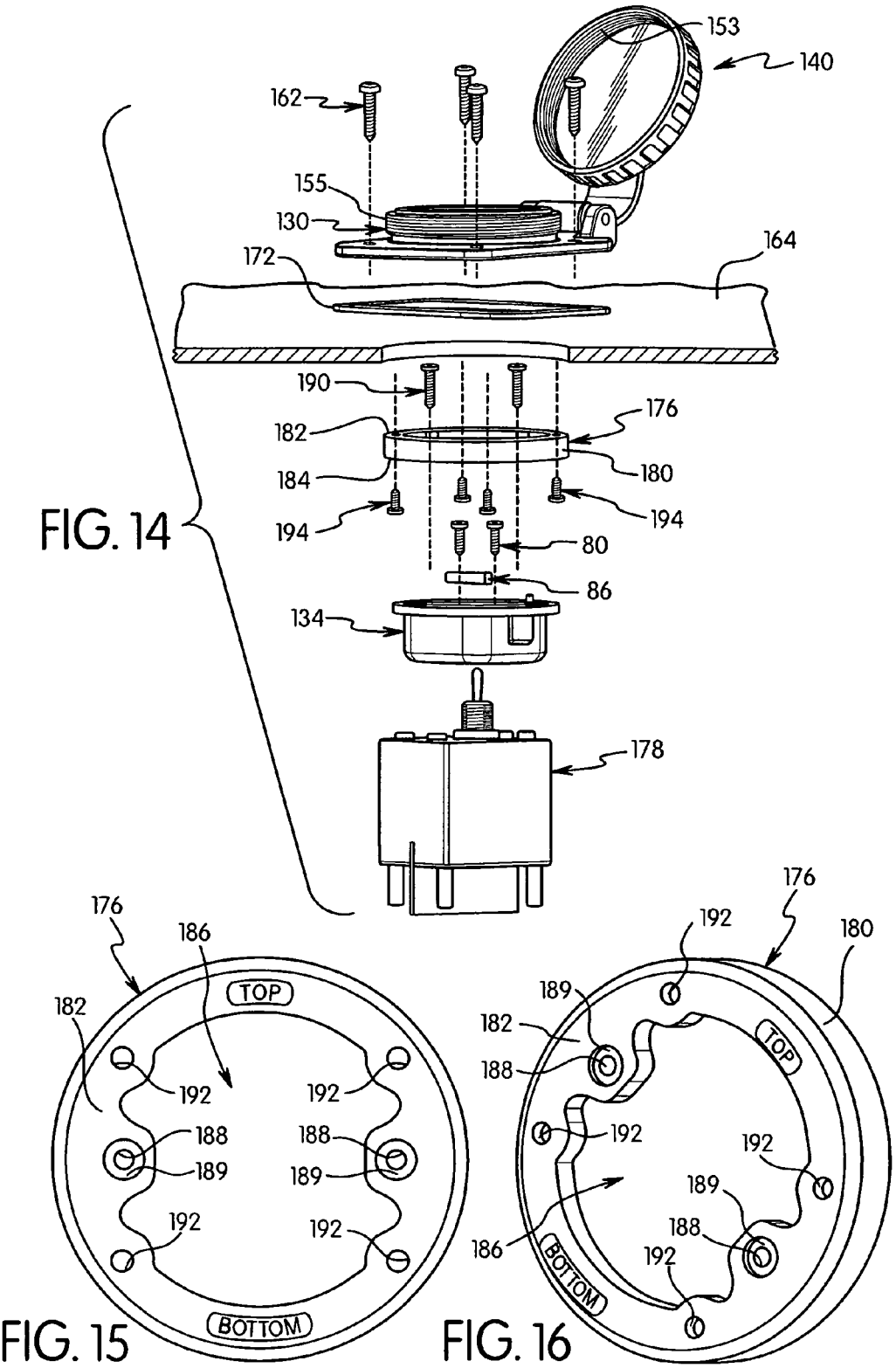

INLET COVER AND ADAPTER ASSEMBLY FOR ELECTRICAL COMPONENTS

FIELD OF THE INVENTION

The present invention is directed to a cover assembly adapted for use in wet locations. The invention is particularly directed to a cover and adapter assembly for use with a variety of electrical devices and for mounting the electrical devices to a support structure. The inlet cover and adapter assembly is suitable in marine environments.

BACKGROUND OF THE INVENTION

Building codes generally require an electrical outlet receptacle or other electrical wire device that is exposed to the weather to have a cover that will enclose the receptacle when not in use. Various cover assemblies have been developed to cover electrical receptacles and other electrical devices such as switches during use and non-use.

Electrical devices are also commonly used in marine environments which require a suitable waterproof cover. The covers can be attached to the outer surface of the marine hull and to the electrical device. Typically, the electrical devices have a construction that can mate with the cover. The shape and construction of the electrical devices is generally specific to the manufacturer and type of device. Typically, the electrical device is able to mate only with a specific cover that is compatible with the electrical device.

Various adapters have been proposed for various purposes to mount a cover or electrical device to an electrical box. For example, U.S. Pat. No. 3,137,763 to Jones discloses an electrical junction box with a weatherproof fixture mounting adapter. The adapter is attached directly to the junction box. A cover plate is then attached to the adapter.

U.S. Pat. No. 3,288,910 to Zerwes discloses a weatherproof extension for an outlet box. The assembly includes a cover hinged to a cover plate. Screws pass through the cover plate and the extension adapter and are threaded directly into the electrical box.

U.S. Pat. No. 4,454,565 to Krasij et al. discloses a circuit breaker and a mating adapter plate to fit to a panel opening intended to receive a larger breaker. The adapter plate is attached to the circuit breaker by screws. The adapter plate has a resilient leg and a rigid leg to be clipped onto the face of the breaker.

U.S. Pat. No. 6,103,972 to Hagarty discloses a junction box assembly for mounting a fire alarm. An adapter is provided for defining an extension for the electrical box and for defining an opening smaller than the open side of the electrical box. The alarm unit is attached directly to the adapter.

U.S. Pat. No. 6,740,813 to Gretz and assigned to Arlington Industries discloses a cover for a ceiling mounted electrical outlet. A cover includes a bracket that is attached to the electrical box. The bracket is attached to the ceiling mounted electrical box by screws. The cover is coupled to the adapter by a peg having ribs for gripping an opening in the bracket.

U.S. Pat. No. 7,683,255 to Hur et al. and assigned to Cooper Technologies Company discloses an adapter plate assembly for outdoor installation of notification applications. The assembly includes an adapter plate having an outer gasket. The electrical device is mounted to the adapter plate and the electrical box by screws passing through the face of the electrical device and through screw holes in the adapter.

U.S. Patent Publication No. 2009/0288853 to Binder et al. discloses an adapter provided for universal mounting of specialized faceplates for mounting to an electrical junction box. The adapter clamps to the inner surface of the wall cavity and the electrical box.

DE 37 38 776, DE 43 12 665, DE 10 2005 062 494 and FR 2 821 212 disclose generally cover plates attached directly to a junction box. DE 44 07 652 discloses a hinged cover plate assembly that is attached to an adapter plate. The adapter plate appears to be mounted to a support surface.

While the prior devices have been suitable for their intended purpose, there is a continuing need in the industry for improved cover assemblies.

SUMMARY OF THE INVENTION

The present invention is directed to a cover assembly adapted for wet conditions. More particularly, the invention is directed to a cover assembly adapted for use in wet locations such as a marine hull inlet where the cover assembly supports an electrical device. The invention is also directed to cover assemblies for a marine hull inlet to support various electrical components such as a marine sensing module or circuit breaker.

Accordingly, one aspect of the invention is to provide a cover assembly that can support an electrical component below the surface of a support where the support has an opening for the electrical device. The cover assembly is adapted to be attached to an outer face of the support to form a waterproof seal around the opening. A gasket can be positioned between the cover assembly and the support to form the waterproof seal. The electrical component is coupled to and supported by the cover assembly. In one embodiment, the electrical component is not directly attached to the support surface and is supported entirely by the cover assembly.

Another aspect of the invention is to provide a cover assembly adapted for attaching to a marine hull. The cover assembly can support an electrical device in an opening in the hull and includes a movable cover to enclose the electrical device.

A further aspect of the invention is to provide a cover assembly adapted for wet locations where the cover includes an adapter positioned between the cover and an electrical component. The adapter can be coupled directly to the electrical component and is constructed to be coupled to a plurality of different covers that have different shapes or dimensions. The adapter enables an electrical component to be coupled to the cover where the electrical component cannot be coupled directly to the cover.

The adapter of the invention is constructed to join the electrical component and the cover together where the cover and electrical component are incompatible and cannot be directly coupled together. The adapter has one or more sets of screw holes that can align with a screw hole pattern of a cover. The adapter in one embodiment has a mounting structure that can couple to different cover assemblies.

The adapter of the invention in one embodiment has a central opening to access the electrical component and a plurality of first screw holes for receiving screws to attach the adapter to the electrical component. The adapter has a plurality of second screw holes for attaching the adapter to a cover.

Another aspect of the invention is to provide an adapter for attaching an electrical component to different cover assemblies having different coupling means. The adapter can have a plurality of different holes for receiving screws to attach the adapter to different cover assemblies.

A further aspect of the invention is to provide an adapter that can be attached to a cover assembly and has a coupling means so that the adapter can be attached to at least two different electrical components that cannot be attached directly to the cover assembly.

These and other aspects of the invention are basically attained by providing an electrical assembly for mounting in an opening in a marine hull to form a waterproof enclosure. The assembly comprises a cover assembly that includes a base for mounting directly to an outer surface of the hull. The base has an opening and a movable cover for closing the opening. An electrical component is coupled to a bottom surface of the base and is accessible through the opening of the frame. A first adapter is positioned between the base and the electrical component. The adapter has a plurality of first screw holes for receiving screws to couple the adapter directly to the base and a plurality of second screw holes for receiving screws to couple the adapter to the electrical component. The electrical component and the adapter have a dimension less than the dimension of the opening in the hull. The cover and first adapter support the electrical component below the opening in the hull.

The various aspects of the invention are further attained by providing an electrical assembly comprising an electrical component and a base having an opening with a dimension for accessing the electrical component. The base has a bottom surface for mating with a substantially planar support surface. An adapter is positioned between the electrical component and the base for coupling the electrical component to the bottom surface of the base. The adapter has an opening for accessing the electrical component and has an outer dimension to be received in the opening in the support surface. The adapter is coupled directly to the base and is coupled to the electrical component.

The aspects and advantages of the invention are also attained by providing an electrical assembly for mounting an electrical component in an opening in a support surface. The assembly comprises at least one electrical component having a top surface with a plurality of threaded holes for receiving mounting screws. The threaded holes are oriented to receive screws passing through holes having a first hole pattern in a first cover assembly. An adapter has a plurality of first holes aligned with the threaded holes of the electrical component for receiving screws for coupling the adapter to the electrical component. The adapter has a plurality of second holes oriented for receiving mounting screws to couple the adapter to a second cover assembly having a second hole pattern. The second hole pattern is different from the first hole pattern.

These and other aspects of the invention will become apparent from the following detailed description of the invention which in conjunction with the annexed drawings disclose various embodiments of the invention.

BRIEF DESCRIPTION OF THE DRAWINGS

The following is a brief description of the drawings in which:

FIG. 7 is a perspective view of the cover assembly in another embodiment of the invention showing a ring adapter for attaching the electrical component to the cover assembly;

FIG. 8 is a top view of the ring adapter of FIG. 7;

FIG. 9 is a perspective view of the ring adapter of FIG. 7;

FIG. 14 is an exploded perspective view of the cover assembly in another embodiment;

FIG. 15 is a top view of the adapter of FIG. 14;

FIG. 16 is a perspective view of the adapter of FIG. 14;

DETAILED DESCRIPTION OF THE INVENTION

The present invention is directed to a cover assembly adapted for use with an electrical component. In particular, the present invention is directed to a cover assembly for wet locations to provide a weatherproof enclosure for an electrical component coupled to the cover assembly. The invention is also directed to an adapter for coupling an electrical component to one or more different cover assemblies.

The cover assembly of the invention is particularly suited for supporting an electrical component such as a circuit breaker where the cover assembly is mounted to the outer face of a support surface having an opening with a dimension to receive the electrical component. The electrical component is suspended below the cover assembly and below the support surface.

In one embodiment, the cover assembly is adapted for use as a marine hull inlet cover for mounting an electrical component to a marine hull. The electrical component can be a standard electrical component or module such as an electrical leakage circuit interrupter (ELCI) marine sensing module or a circuit breaker.

Figure 1:
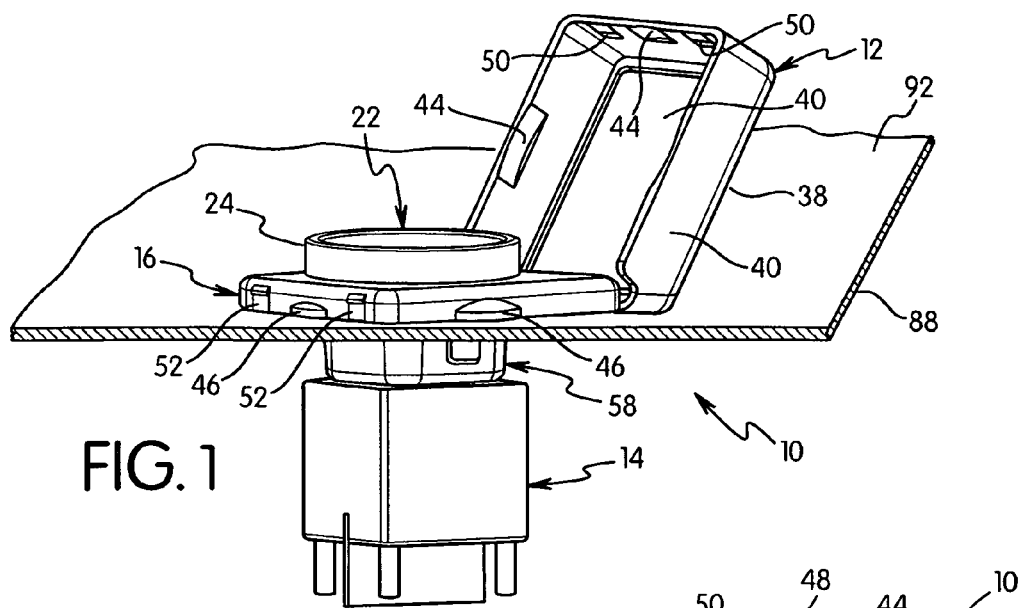
FIG. 1 is a perspective view of the cover assembly in one embodiment of the invention showing the cover assembly with an electrical component mounted to a support.

Referring to FIG. 1, the electrical assembly 10 in a first embodiment of the invention includes a cover assembly 12 and an electrical component 14. The electrical assembly 10 is adapted for use in wet locations to provide a weatherproof enclosure for the electrical component 14. The assembly is particularly suited for mounting to a marine hull having an inlet opening for the electrical component.

Cover assembly 12 includes a base 16 defining a bottom portion of the cover assembly. The base 16 in the embodiment illustrated has a substantially planar configuration with a flat bottom surface 18 and a top surface 20. The bottom surface 18 preferably has a shape to complement the shape of the support surface as discussed below. In other embodiments, the bottom surface can have a curved surface to mate with a curved support surface. Base 16 has an opening 22 and a collar 24 surrounding the opening 22. The opening 22 is positioned to align with the electrical component and is generally located at or near the center of the base. As shown in FIG. 1, collar 24 has a substantially cylindrical shape and extends upwardly in a perpendicular direction to the top surface 20. Collar 24 typically has a dimension to direct water away from the opening 22 while allowing access to the electrical component supported below the cover assembly. The opening 22 and collar 24 are oriented to receive the electrical component.

Figure 3:
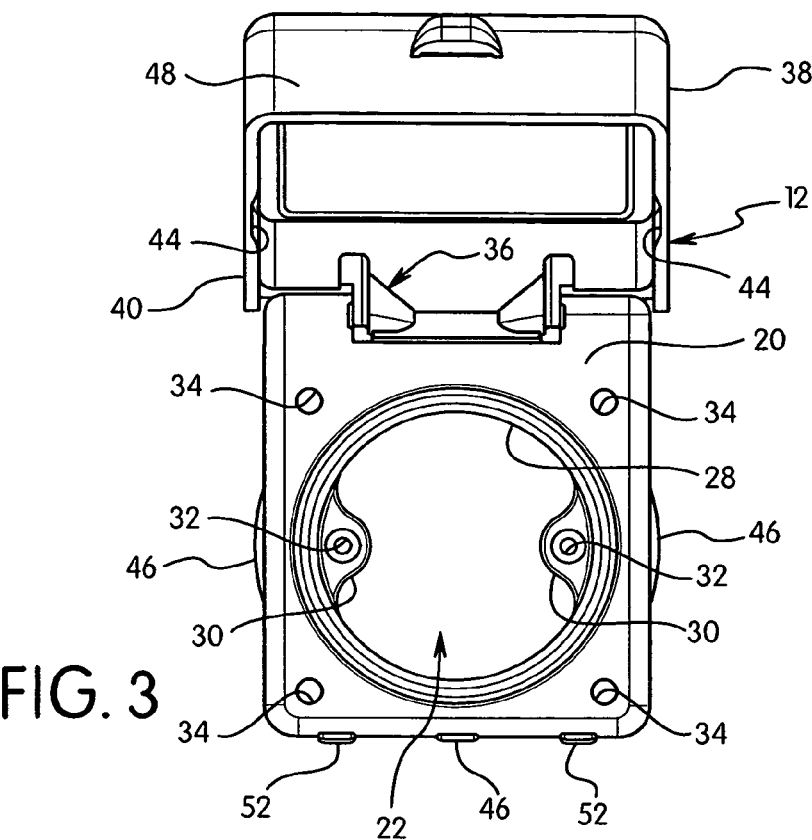
FIG. 3 is a top view of the cover assembly in a first embodiment of the invention.
Figure 4:
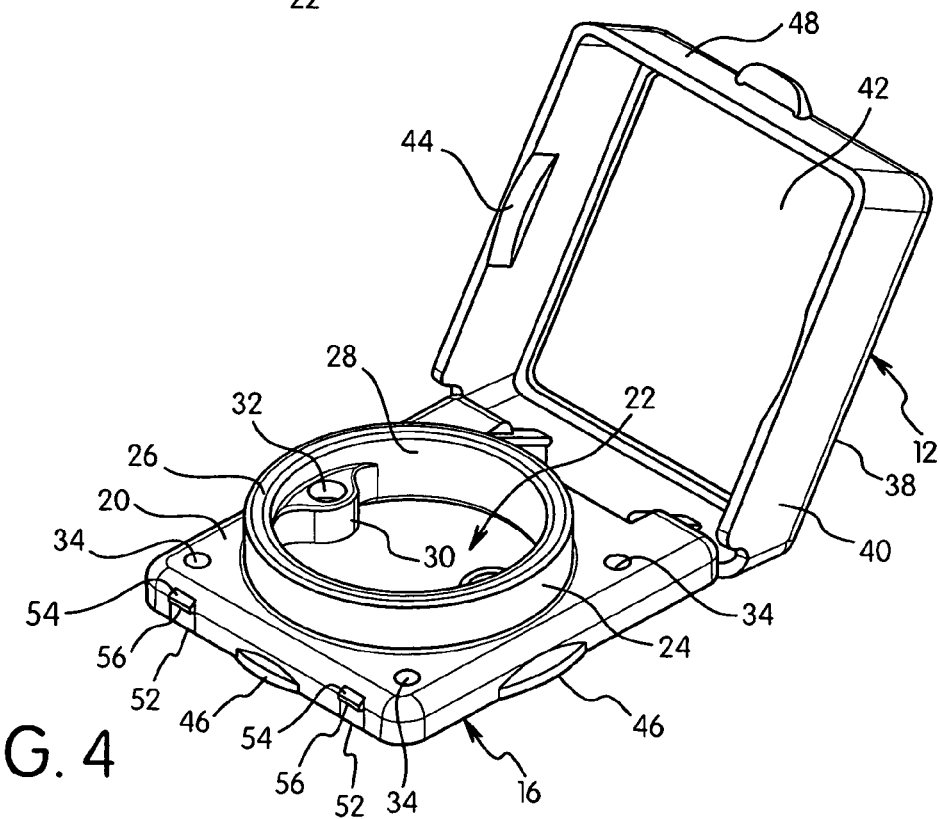
FIG. 4 is a perspective view of the cover assembly of FIG. 3.

Referring to FIGS. 3 and 4, collar 24 has a ridge 26 on the upper axial face to form a seal with the cover and divert water away from the opening 22. Opening 22 and collar 24 have a dimension to allow access to the electrical component 24 by the user. The inner surface 28 of collar 24 has two inwardly extending portions 30 having a screw hole 32 as shown in FIGS. 3 and 4 for coupling the cover assembly to the electrical component.

Figure 2:
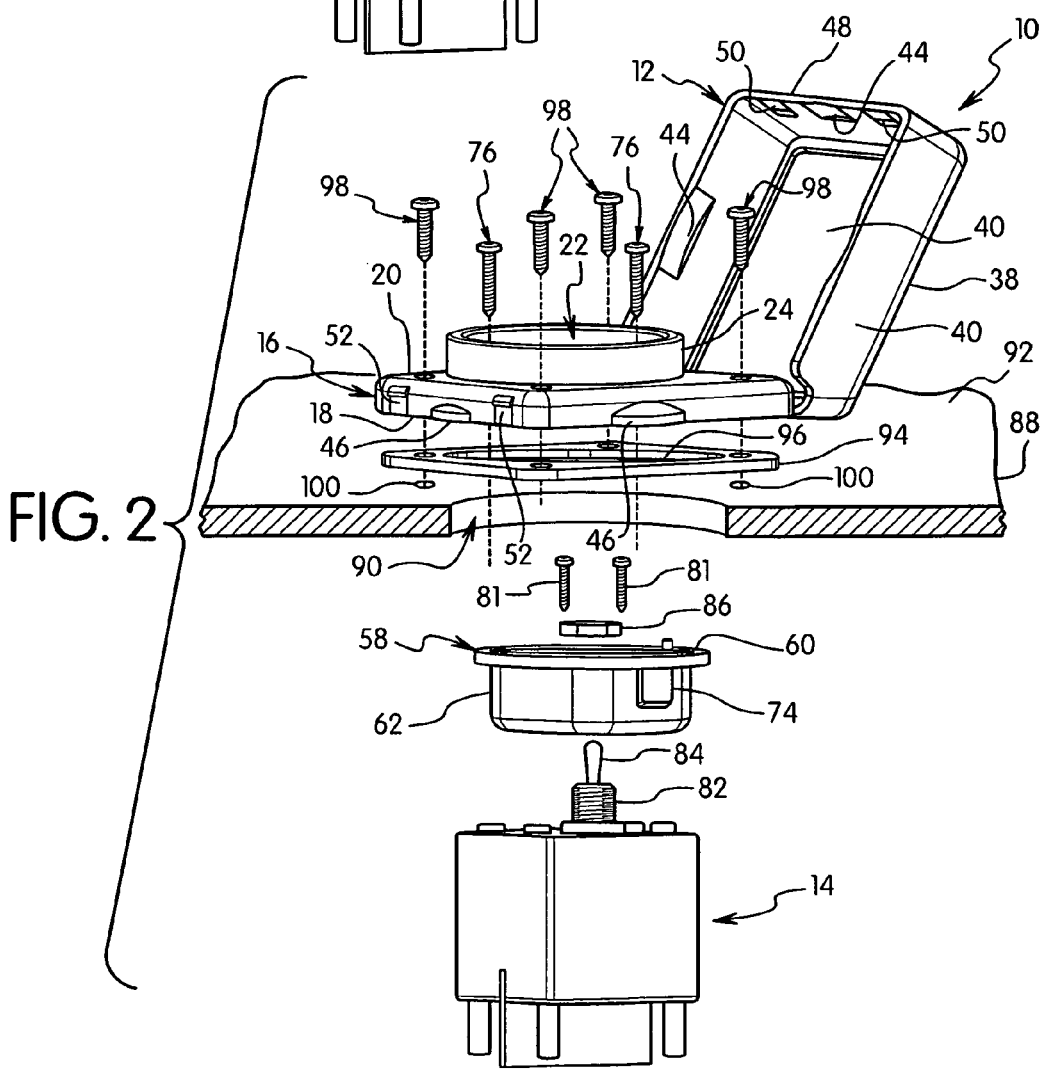
FIG. 2 is an exploded view of the cover assembly of FIG. 1.

Base 16 has a substantially flat top surface with screw holes 34 in each of the corners of the base for mounting the cover assembly to a support surface. Base 16 includes a hinge portion 36 for coupling to a cover 38. Cover 38 has an outer side wall 40 that encloses base 16 when in the closed position. Cover 38 has a top wall 42 to overlie the collar 24 when in the closed position. Each side of outer side walls 40 includes a recess 44 that receives a detent 46 on the outer face of base 16 in the closed position. A front wall 48 of cover 38 has a pair of recesses 50 as shown in FIG. 2 that mate with a corresponding detent 52 on base 16 to form a snap closure. Each of the detents 52 have an inclined upper surface 54 and a hook portion 56 as shown in FIG. 4 to form the snap connection.

In the embodiment of FIG. 1, electrical assembly 10 includes a cup adapter 58 for coupling the electrical component 14 to the base 16 of cover assembly 12. Cup adapter 58 has a top wall 60, a side wall 62 extending downwardly from top wall 60 and a bottom wall 64. Side wall 62 forms an open top end 66 having a dimension to correspond substantially to or complementing the opening 22 in base 16. Top wall 60 includes indicia 68 corresponding to the electrical component 14. Preferably, indicia 68 is visible through the central opening 22 when cup adapter 58 is coupled to base 16. Top wall 60 extends outwardly from the side wall 62 a distance to mate with the bottom surface of the base 16. Preferably, the top wall 60 has a diameter greater than the inner diameter of the opening 22 in the base 16. Top wall 60 has a cylindrical pin 70 extending upwardly for mating with a corresponding recess in the bottom surface of base 18 (not shown) to align the cup adapter 58 with the central opening 22 in the base 16.

Figure 5:
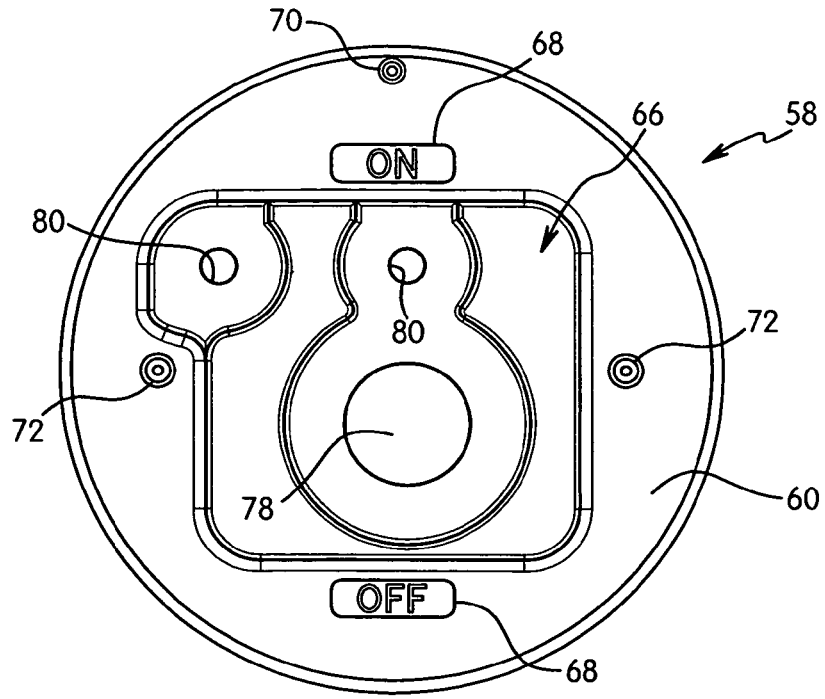
FIG. 5 is a top view of the cup adapter in one embodiment of the invention.
Figure 6:
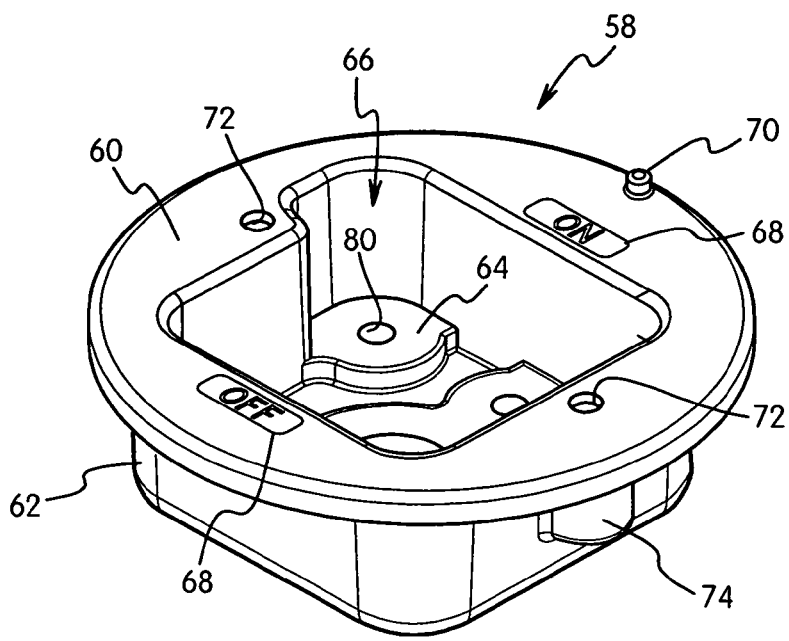
FIG. 6 is a perspective view of the cup adapter of FIG. 5.

As shown in FIGS. 5 and 6, top wall 60 includes two threaded screw holes 72 extending downwardly through top wall 60 into blocks 74 on the outer surface of side wall 62 and bottom side of the top wall 60. Screw holes 72 are aligned with screw holes 32 of base 16. Screws 76 extend downwardly through the screw holes 32 into the threaded screw holes 72 for coupling the cup adapter directly to the bottom surface of base 16. As shown in FIG. 2, screws 76 are positioned inside the collar 24.

Bottom wall 64 of cup adapter 58 is adapted for coupling to the electrical component 14. As shown in FIG. 5, bottom wall 64 includes a bottom opening 78 for receiving the electrical component 14. Screw holes 80 are also formed for coupling the cup adapter 58 to the electrical component 14. In the embodiment illustrated, the electrical component 14 is a circuit breaker having a top surface with a threaded sleeve 82 and a toggle switch 84. Threaded sleeve 82 and toggle switch 84 pass through the opening 78 in the bottom wall 64 of cup adapter 58 to be positioned within the cavity of the cup adapter 58. A threaded nut 86 is threaded onto the threaded sleeve to attach the electrical component 14 to the cup adapter 58. Screws 81 extend through the holes 80 into the electrical component. In the embodiment illustrated, the electrical component 14 is a circuit breaker sold under the tradename SENSATA circuit breaker, although other electrical components can be used. The shape and locations of the openings in the bottom of adapter 58 can be located to complement the shape and dimensions of the electrical component.

Electrical assembly 10 is adapted for mounting to a support surface. The support surface 88 can be a wall or a panel. In one embodiment of the invention, support surface 88 is a marine hull inlet. The support surface 88 has an opening 90 with a dimension to receive the cup adapter 58 and the electrical component 14. Preferably, cup adapter 58 is coupled to the electrical component and to the cover assembly 12 to form an assembled unit. In one embodiment, a gasket or seal is provided between the adapter 58 and the cover assembly 12 to provide a watertight seal. The assembled unit is passed through the top face 92 of the support surface 88 so that the electrical component 14 is suspended by the cover assembly 12 and positioned below the surface of the support surface 88 as shown in FIG. 1.

A gasket 94 is positioned between the support surface and the bottom surface 18 of the base 16. As shown in FIG. 2, gasket 94 has a shape corresponding to the shape of base 16 with an opening 96 corresponding to the opening 90 in the support surface 88 and the opening 22 of the base 16. Mounting screws 98 pass through screw holes 34 in base 16 and corresponding holes in the gasket 94 and are threaded into corresponding screw holes 100 in the support surface. Gasket 94 preferably forms a waterproof seal between the base 16 and the support surface 88. Preferably, screw holes 100 are threaded holes or drilled holes to receive a self-tapping screw to secure the cover assembly to the support surface.

In a second embodiment shown in FIG. 7, cover assembly 12' is mounted to a support surface 102 and is coupled to a ring shaped adapter 104 for connecting to an electrical component 106. Cover assembly 12' is the same as in the embodiment of FIG. 1 so that the components are identified by the same reference number with the addition of a prime.

In the embodiment of FIG. 7, electrical component 106 is a ground fault sensing module having a top face 108 with a switch 110. Top face 108 has a plurality of threaded screw holes 112 spaced adjacent the four corners of the electrical component 106. In the embodiment of FIG. 7, the electrical component 106 is a circuit breaker such as a Carling B-Series Ground Fault Circuit Breaker.

Ring adapter 104 has a substantially circular shape with an outer side surface 114, a top surface 116 and a bottom surface 118. Ring adapter 104 has a central opening 120 with a dimension to accommodate the electrical component and the opening 22' in the cover assembly 12'. Adapter 104 has a size and shape to fit within the opening 103 in the support surface 102.

Figure 10:
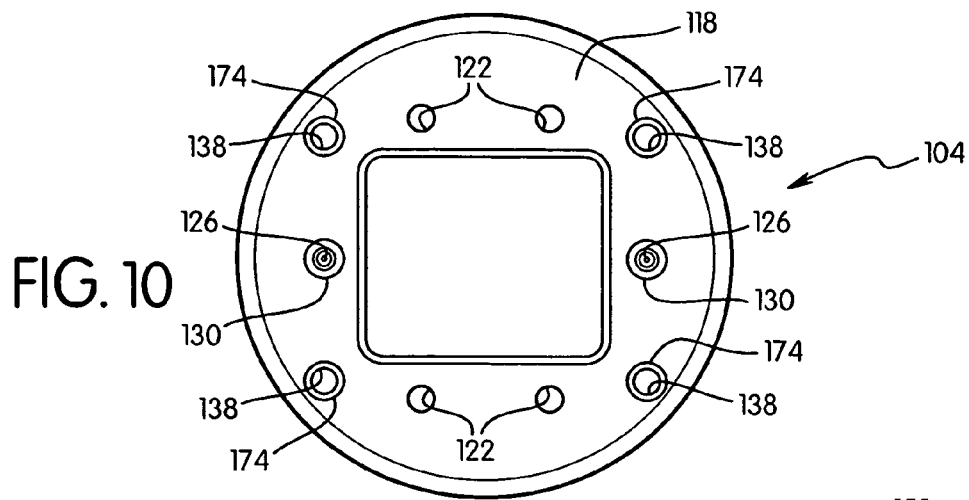
FIG. 10 is a bottom view of the adapter of FIG. 7.

As shown in FIGS. 8 and 9, central opening 120 of adapter ring 104 has a substantially rectangular configuration to accommodate the electrical component 106. Top face 116 of adapter 104 has a first set of screw holes 122 passing through the adapter 104 and are countersunk with respect to the top face 116 to form a recess 123. Screw holes 122 have a pattern corresponding to the screw holes 112 in the electrical component 106. Adapter 104 is coupled directly to the electrical component 106 by screws 124 that pass downwardly through the adapter 104 into the threaded screw holes. The heads of the screws 124 are recessed in the countersink recess 123 of screw holes 122 to sit at or below the top face 116. A second set of screw holes 126 are positioned in a pattern corresponding to the adapter screws 128 passing through the cover assembly 12'. Screw holes 126 in the embodiment shown are threaded holes to receive the screws. The bottom face 118 of adapter 104 includes a cylindrical lug 130 as shown in FIG. 10 aligned with the screw holes 126 so that the screw holes extend therethrough to receive the adapter screws 128.

Adapter 104 is attached to the electrical component 106 by the screws 124 as shown in FIG. 7. Adapter 104 is then coupled to the bottom face of the cover assembly 12 by the adapter screws 128 passing through the screw holes of the cover assembly as in the previous embodiment. A gasket 132 is positioned between the cover assembly 12' and the support surface 102. Screws 136 extend through the base 16' of cover assembly 12' and are threaded into threaded holes in the support surface to mount the electrical component and cover assembly to the support surface.

Figure 11:
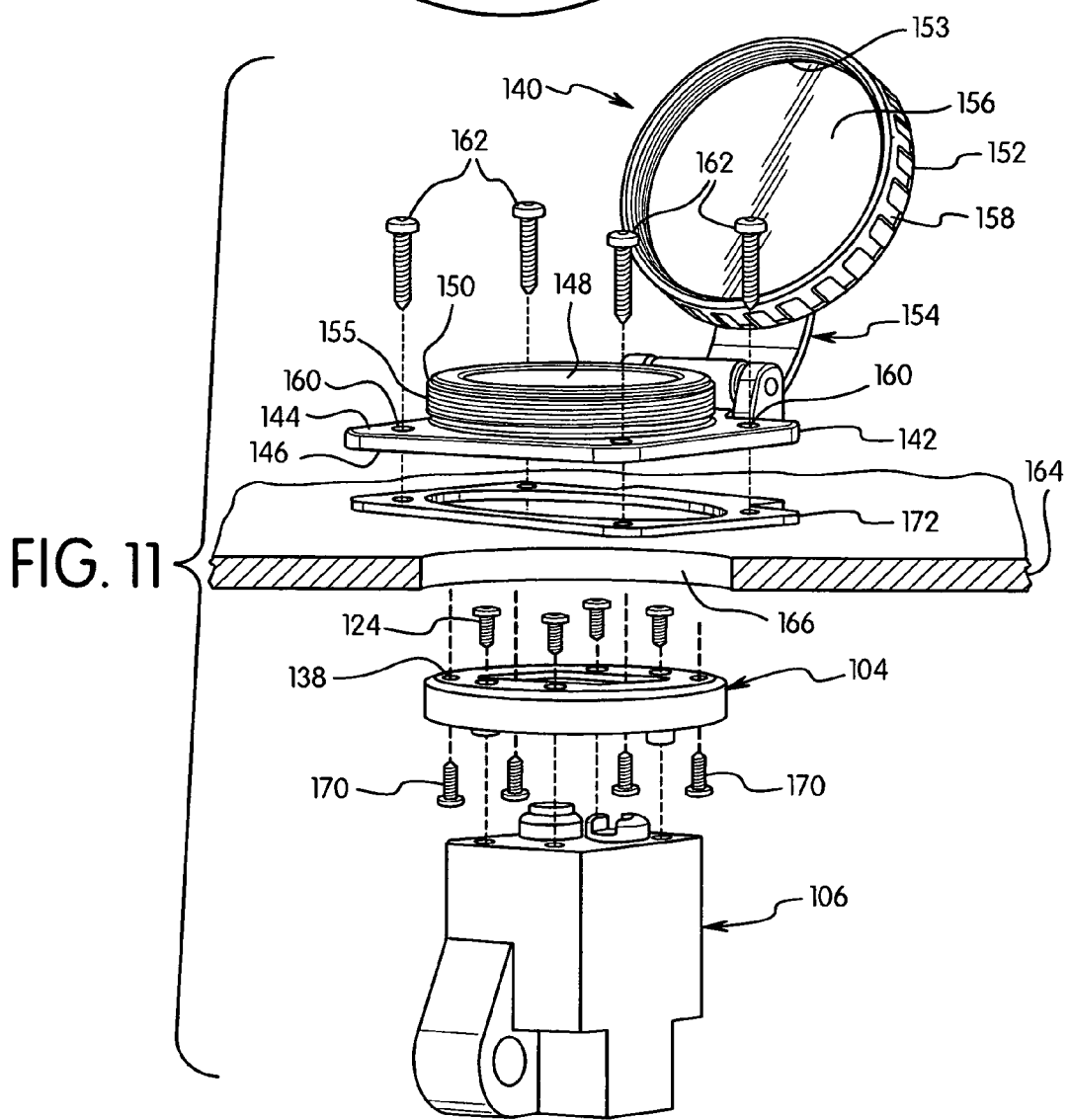
FIG. 11 is an exploded perspective view of the assembly showing the ring adapter connected to another cover assembly.
Figure 12:
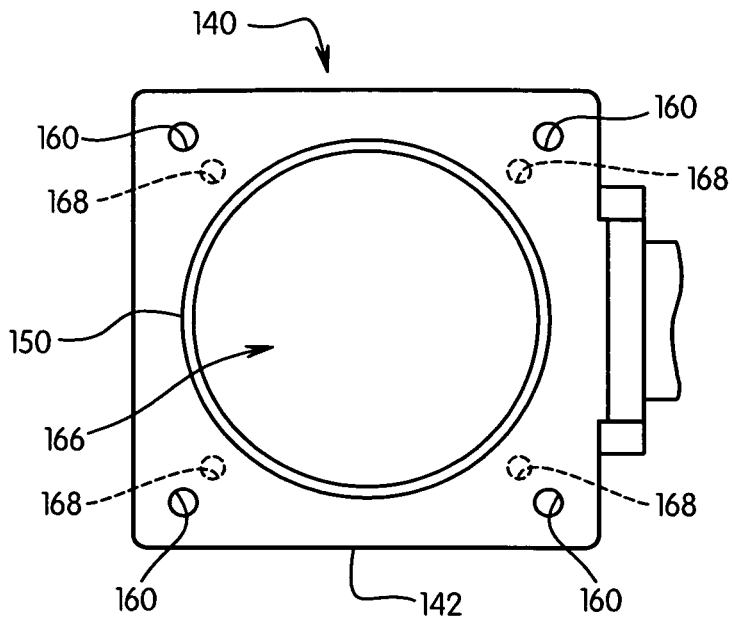
FIG. 12 is a top view of the cover assembly of FIG. 11.

Adapter 104 also includes a set of screw holes 138 that are oriented in a pattern corresponding to a second cover assembly 140 shown in FIG. 11. The screw holes 138 enable the adapter to be coupled to different cover assemblies and/or electrical components that have different patterns of screw holes.

Cover assembly 140 as shown in FIG. 11 has a base 142 having a substantially square shape with a top surface 144 and bottom surface 146. Base 142 includes an opening 148 with a collar 150 extending upwardly from top surface 144. A circular shaped cover 152 is hinged to the base 142 by a hinge assembly 154. Cover 152 has a circular shape with a top wall 156 and a circular side wall 158 with a dimension to surround the collar 150. Cover assembly 140 in one embodiment has cover 152 rotatably connected to the hinge assembly 154. The cover 152 can have internal threads 153 on the inner surface of the side wall 158 for mating with external threads 155 on the outer surface of collar 150.

As shown in FIG. 11, base 142 has a plurality of screw holes 160 for receiving mounting screws 162 for mounting cover assembly 140 to a support surface 164 such as a marine hull. A gasket 172 is positioned between the cover assembly 140 and the surface of the support surface 164. As in the previous embodiment, support surface 164 has an opening 166 to receive the electrical component 106 and the adapter 104. The electrical component 106 and the adapter 104 are as shown in FIGS. 7-10.

Figure 13:
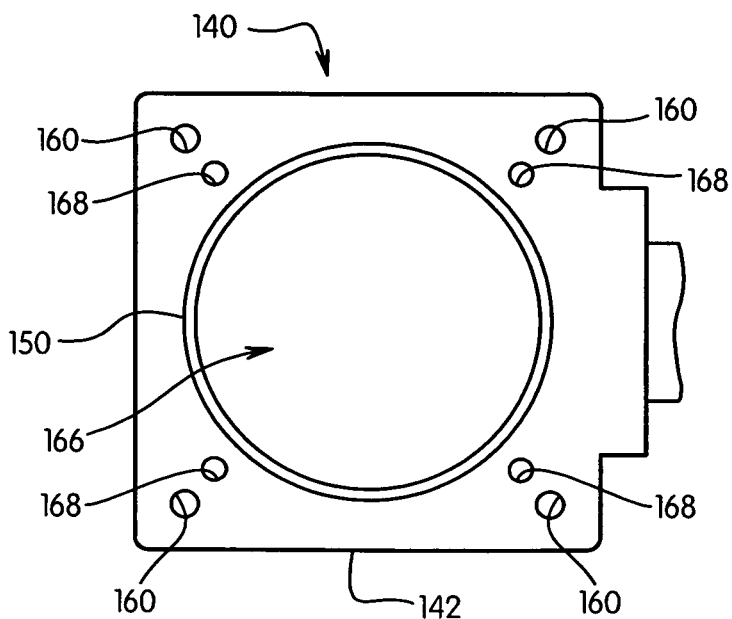
FIG. 13 is a bottom view of the cover assembly of FIG. 11.

The bottom surface 146 of base 142 includes a plurality of threaded holes 168 as shown in FIG. 13. Screws 170 as shown in FIG. 11 pass upwardly through screw holes 138 in adapter 104 and are threaded into the threaded screw holes 168 to couple the adapter 104 to the base 142. In a preferred embodiment, the bottom face 118 of adapter 104 includes a countersink recess 174 aligned with the screw holes 138 to receive the heads of the screws 170.

As shown in FIG. 11, adapter 104 includes a plurality of screw holes for mounting two different cover assemblies 40 and 140 where each of the cover assemblies have a different screw hole pattern such that the cover assemblies cannot be coupled directly to the electrical component. The adapter 104 enables different cover assemblies to be attached to an electrical component that cannot be attached directly to the cover assembly.

In another embodiment shown in FIGS. 14-17, an adapter 176 is provided for coupling the cup adapter 134 and an electrical component 178 to the cover assembly 140 where the cup adapter 134 and the electrical component 178 have a screw hole pattern that is not compatible with the cover assembly 140 and cannot be coupled directly to the cover assembly 140. The cup adapter 134 and electrical component 178 are as shown and described in the embodiment of FIGS. 1-6 so that it is not necessary to describe the cup adapter 134 and electrical component further.

Figure 17:
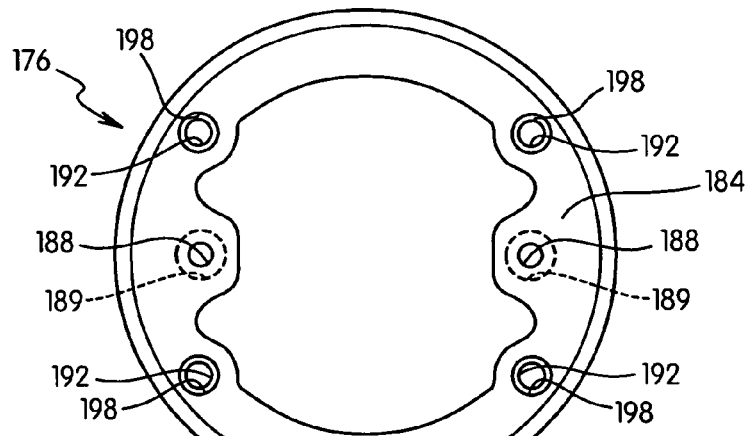
FIG. 17 is a bottom view of the adapter of FIG. 14.

Adapter 176 has a circular shape with an outer side 180, a top surface 182 shown in FIGS. 15-16 and a bottom surface 184 shown in FIG. 17. Adapter 176 includes a central opening 186 to accommodate the electrical component. Preferably, central opening 186 has a dimension corresponding to the open end of the cup adapter 134 to allow access to the electrical component 178.

As shown in FIGS. 15 and 16, adapter 176 includes a pair of countersunk screw holes 188 having a recess 189 in the top surface 182 that are oriented with respect to the threaded screw holes 72 in the cup adapter 134. Adapter screws 190 as shown in FIG. 14 pass through the screw holes 188 and are threaded into the cup adapter 134 to secure the adapter 176 to the cup adapter 134. Preferably, the heads of the screws 190 are received in the countersink recess 189 of screw holes 188 to sit at or below the face of the adapter 176. Adapter 176 also includes a plurality of screw holes 192 that are countersunk to form a recess 198 on the bottom surface 184. Screw holes 192 are aligned with the threaded holes in the bottom surface of the cover assembly 140 to receive screws 194. Screw holes 192 have a countersunk recess 198 on the bottom face 184 as shown in FIG. 17. Preferably, the heads of the screws 194 are received in the recess 198 to sit at or below the surface of the adapter 176.

Figure 18:
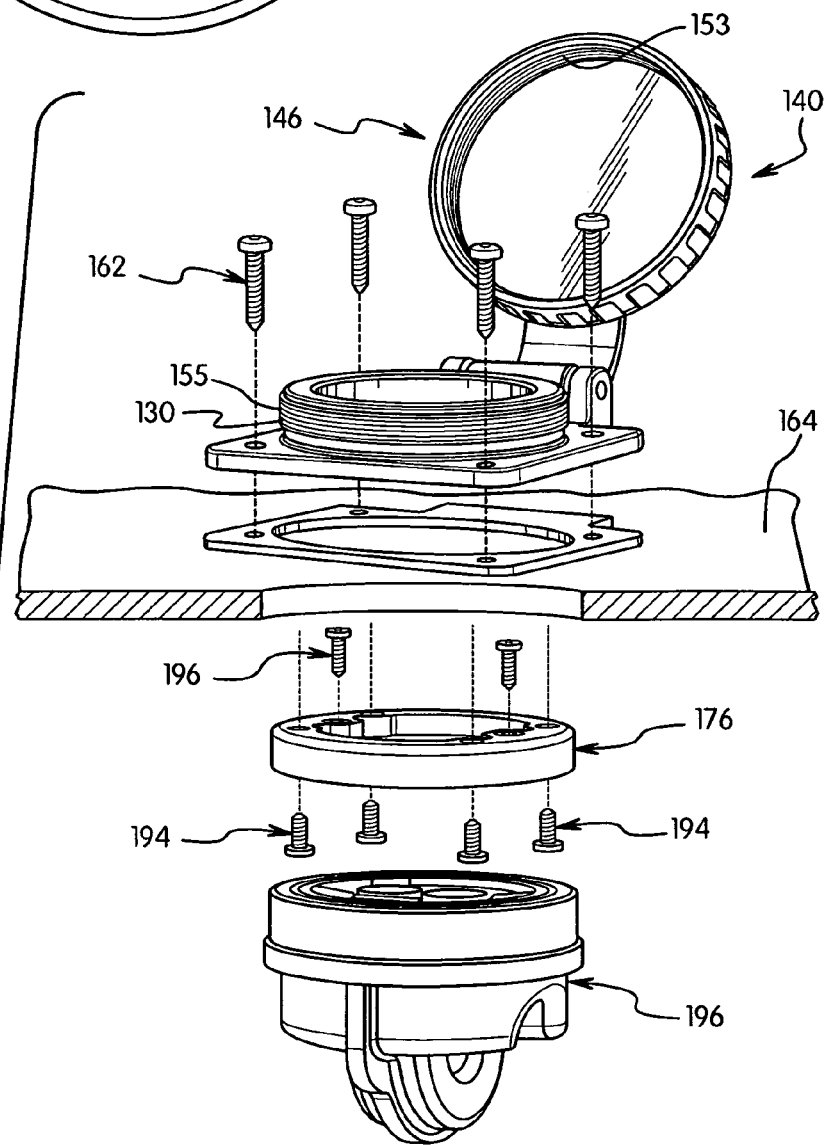
FIG. 18 is an exploded perspective view of the cover assembly in another embodiment using the adapter of FIG. 14.

As shown in FIG. 18, adapter 176 is also capable of coupling directly to an electrical component 196 having threaded holes for receiving the screws 190. As shown, adapter 176 is capable of mounting two different electrical components having different screw hole patterns to a cover assembly without requiring modification of the cover assembly. The electrical component shown in FIG. 18 is a ground fault sensing unit sold as a North Shore Safety Ground Fault Sensing Module.

The adapters of the present invention are constructed to couple one or more electrical components directly to a cover assembly where the mounting means for the cover assembly such as the screw hole pattern is not compatible with the electrical component. The adapter can be coupled directly to the electrical component and to the cover assembly without required modification of the cover assembly or the electrical component.

While various embodiments have been chosen to illustrate the invention, it will be understood by those skilled in the art that various changes and modifications can be made without departing from the scope of the invention as defined in the appended claims.

What is claimed is:

1. An electrical assembly for mounting in an opening in a support to form a waterproof enclosure, said assembly comprising:
    a cover assembly including a base for mounting directly to an outer surface of the support, said base having a central opening and a movable cover for closing said central opening;
    an electrical component coupled to a bottom surface of said base and being accessible through said central opening of said base; and
    a first adapter positioned between said base and said electrical component for coupling said electrical component o said cover assembly, said adapter having a plurality of first screw holes for receiving first screws to couple said adapter directly to said base and a plurality of second screw holes for receiving second screws to couple said adapter to said electrical component, said second screw holes being spaced from said first screw holes, said electrical component and said adapter having an outer dimension less than the dimension of the opening in the support and less than an outer dimension of said base, said base and first adapter supporting said electrical component below the opening in the support.

2. The assembly of claim 1, further comprising a gasket positioned between said base and said support.

3. The assembly of claim 1, wherein
said electrical component is a circuit breaker or a ground fault sensing module.

4. The assembly of claim 1, wherein
said base includes a collar surrounding said central opening, said base having a plurality of said first screw holes for receiving the first screws to couple the adapter to the base, and a plurality of second screw holes spaced from said first screw holes and being outside the circumference of the collar for receiving screws to mount the base to the support.

5. The assembly of claim 4, wherein
said first screw holes of said base are positioned within the circumference of the collar, said first screw holes of said adapter are threaded holes for receiving screws passing through said first holes in said base, and said electrical component includes threaded holes for receiving the screws passing through said second screw holes in said adapter for coupling said adapter to said electrical component.

6. The assembly of claim 1, further comprising
a second adapter positioned between said first adapter and said electrical component, said second adapter having a bottom wall coupled to said electrical component and a side wall extending upwardly from said bottom wall and being coupled to said first adapter, said bottom wall having an opening for receiving a portion of said electrical component, whereby said electrical component is recessed with respect to said base and first adapter.

7. The assembly of claim 4, wherein
said first screw holes in said base are threaded holes in a bottom surface of said base and said first screw holes of said adapter receive the first screws passing through into said base, and where said second screw holes in said adapter receive the second screws that are threaded into threaded holes in said electrical component.

8. The electrical assembly of claim 4, wherein
said first screw holes are positioned within the circumference of said collar.

9. The electrical assembly of claim 1, wherein
said base has a plurality of first screw holes for receiving said first screws, and where at least one of said plurality of first screw holes in said base and said plurality of first screw holes in said adapter are internally threaded to receive said first screws.

10. The electrical assembly of claim 9, wherein
said first screw holes in said adapter are internally threaded to receive said first screws to couple said adapter to said base.

11. The electrical assembly of claim 9, wherein
said first screw holes in said base are internally threaded to receive said first screws to couple said adapter to said base.

12. The electrical assembly of claim 1, wherein
said second screw holes in said adapter are spaced from said first screw holes in said adapter.

13. An electrical assembly comprising:
an electrical component;
a base having an opening with a dimension for accessing said electrical component, said base having a bottom surface for mating with a support surface; and
an adapter positioned between said electrical component and said base for coupling said electrical component to said bottom surface of said base, said adapter having a central opening for accessing said electrical component, and having an outer dimension to be received in the opening in the support surface, said adapter having a first screw hole for receiving a first screw to couple said adapter directly to said base and a second screw hole spaced from said first screw hole for receiving a second screw to couple said adapter to said electrical component.

14. The assembly of claim 13, wherein
said electrical component is a circuit breaker or a ground fault sensing module and where said support surface is a marine hull.

15. The assembly of claim 13, wherein
said second screw holes of said adapter are spaced from said first screw holes; and
said electrical component has a top surface with a plurality of threaded holes receiving screws passing through said second screw holes for coupling said electrical component to said adapter.

16. The assembly of claim 15, wherein
said first screw holes in said adapter are threaded holes and said base includes first holes for receiving screws passing through said base into said adapter.

17. The assembly of claim 16, wherein said base includes
a collar surrounding said opening in said base, said first holes being positioned within the circumference of said collar; and
a movable cover coupled to said base for covering said collar.

18. The assembly of claim 15, wherein
said base includes a plurality of threaded holes in said bottom surface for receiving screws passing through said first holes in said adapter and coupling said adapter directly to said base.

19. The assembly of claim 18, wherein said base includes
a collar surrounding said opening in said base; and
a movable cover coupled to said base for covering said collar.

20. The assembly of claim 19, further comprising
a cup adapter positioned between said adapter and said electrical component, said cup adapter having a bottom wall with a central opening to receive a portion of said electrical component, a plurality of screw holes in said bottom wall for receiving screws for coupling said cup adapter to said electrical component, and a side wall extending from said bottom wall and coupled to said adapter.

21. The electrical assembly of claim 13, wherein
said first screw hole is threaded to receive the first screw.

22. The electrical assembly of claim 21, wherein
said base has a screw hole aligned with said first screw hole of said adapter for receiving said first screw.

23. The electrical assembly of claim 13, wherein
said base has a threaded screw hole aligned with said first screw hole of said adapter, and where said first screw passes through said first hole and is screwed into said threaded hole to couple said adapter to said base.

24. An electrical assembly for mounting an electrical component in an opening in a support surface, said assembly comprising:
at least one electrical component having a top surface with a plurality of threaded holes for receiving mounting screws, said threaded holes being oriented to receive screws passing through screw holes having a first hole pattern in a first cover assembly; and
an adapter for coupling said electrical component to a second cover assembly having a plurality of first screw holes aligned with said threaded holes of said electrical component for receiving first screws for coupling said adapter to said electrical component, said adapter having a plurality of second screw holes spaced from said first screw holes and oriented for receiving second mounting screws to couple the adapter to said second cover assembly having screw holes in a second hole pattern, said second hole pattern being different from said first hole pattern.

25. The assembly of claim 24, wherein
said second screw holes are threaded holes and said second cover assembly includes holes for receiving screws passing through said screw holes in said second cover assembly into said threaded second screw holes in said adapter for coupling said second cover assembly to said adapter.

26. The assembly of claim 24, wherein
said second cover assembly includes a plurality of threaded holes in a bottom surface of said second cover assembly for receiving screws passing through said second holes in said adapter for coupling said adapter to said second cover assembly.

27. The assembly of claim 26, further comprising
a cup adapter having a bottom wall with a plurality of screw holes for receiving screws for coupling said cup adapter to said electrical component, and a side wall extending from said bottom wall and having a plurality of threaded holes for receiving screws to couple said cup adapter to said second adapter.

28. The assembly of claim 24, wherein
said first and second cover assemblies have a base with a bottom surface for mounting directly to a support surface having an opening therein with a dimension to receive said electrical component and said adapter, each base having a central opening to access said electrical component and cover to close said central opening and cover said electrical component.

29. The electrical assembly of claim 24, wherein
said adapter having a plurality of third screw holes and said screw holes in said second cover include internal threads for receiving screws passing through said third screw holes to couple said adapter to said second cover.

30. The electrical assembly of claim 24, wherein
said second cover includes mounting holes for coupling the second cover to a support surface, and where said screw holes in said second cover are spaced inwardly from said mounting holes.

* * * * *